United States Patent
Liu et al.

(10) Patent No.: US 10,569,378 B2
(45) Date of Patent: Feb. 25, 2020

(54) AUTOMATIC WHEEL FRONT BURR REMOVING DEVICE

(71) Applicant: CITIC Dicastal CO., LTD, Qinhuangdao (CN)

(72) Inventors: Huiying Liu, Qinhuangdao (CN); Yuexin Lu, Qinhuangdao (CN); Xinyu Bi, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 174 days.

(21) Appl. No.: 15/839,110

(22) Filed: Dec. 12, 2017

(65) Prior Publication Data
US 2019/0022815 A1 Jan. 24, 2019

(30) Foreign Application Priority Data

Jul. 21, 2017 (CN) .......................... 2017 1 0598327

(51) Int. Cl.
*B24B 9/00* (2006.01)
*B24B 9/04* (2006.01)
*B60B 7/00* (2006.01)
*B60B 30/00* (2006.01)

(52) U.S. Cl.
CPC ............... *B24B 9/002* (2013.01); *B24B 9/04* (2013.01); *B60B 7/00* (2013.01); *B60B 30/00* (2013.01); *B60B 2360/104* (2013.01); *B60B 2900/572* (2013.01)

(58) Field of Classification Search
CPC ........... B24B 9/002; B24B 9/04; B24B 51/00; B24B 29/005; B60B 30/00; B60B 2360/104

USPC .......................... 451/184, 362, 363, 342, 66
See application file for complete search history.

(56) References Cited

U.S. PATENT DOCUMENTS

| 415,886 A * | 11/1889 | Stuckel | B24B 27/02 451/178 |
| 4,769,952 A * | 9/1988 | Pedrini | B24B 41/047 451/123 |
| 4,872,289 A * | 10/1989 | Yukawa | B23Q 7/043 451/67 |
| 6,217,424 B1 * | 4/2001 | Stephens | B24B 5/44 451/254 |
| 8,008,884 B2 * | 8/2011 | Krupyshev | H01L 21/67742 318/568.21 |
| 8,069,566 B2 * | 12/2011 | Linnenbrink | B21H 5/022 29/407.05 |
| 10,010,992 B2 * | 7/2018 | Xue | B24B 5/44 |
| 10,112,282 B2 * | 10/2018 | Xue | B24B 5/44 |
| 10,160,085 B2 * | 12/2018 | Xue | B24B 9/04 |

(Continued)

*Primary Examiner* — George B Nguyen
(74) *Attorney, Agent, or Firm* — Calfee, Halter & Griswold LLP

(57) ABSTRACT

Disclosed is an automatic wheel front burr removing device, including a station rotating motor, a station I manipulator, a station II manipulator, a station III manipulator, a station IV manipulator, a rim burr cutter head, a feeding slide plate I, guide posts I, cylinders I, a servo motor I, a feeding slide plate II, guide posts II, cylinders II, a servo motor II and a vision sensor. The station I is a wheel positioning and clamping station; the station II is a wheel rim burr removing station; the station III is a wheel cap section burr removing station; and the station IV is a wheel loosening and transferring station.

3 Claims, 3 Drawing Sheets

(56) References Cited

U.S. PATENT DOCUMENTS

| | | | |
|---|---|---|---|
| 10,213,890 B2* | 2/2019 | Xue | B24B 5/44 |
| 10,220,484 B2* | 3/2019 | Xue | B24B 5/44 |
| 10,232,485 B2* | 3/2019 | Xue | B24B 5/44 |
| 10,232,490 B2* | 3/2019 | Xue | B24B 29/005 |
| 10,239,181 B2* | 3/2019 | Xue | B24B 27/0023 |
| 2008/0039000 A1* | 2/2008 | Bennett | B24B 37/30 451/363 |

* cited by examiner

AUTOMATIC WHEEL FRONT BURR REMOVING DEVICE

CROSS-REFERENCE TO RELATED APPLICATIONS

This application claims priority to Chinese Patent Application No. 201710598327.7, filed on Jul. 21, 2017, which is hereby incorporated by reference in its entirety.

TECHNICAL FIELD

The present application relates to the technical field of wheel burr cleaning, specifically to a device for removing burrs from the front rim and the cap section of a wheel.

BACKGROUND ART

For an aluminum wheel of a full coating process, the front side is often cast, the remaining parts are turned by machining, the front rim of the wheel has a joint of machining and casting, and a ring of sharp-angled burrs is shown at the joint. Similarly, the front side of a cap section of the wheel is also cast, the depth is turned by machining, and a ring of sharp-angled burrs also remains at the joint of casting and machining. The burrs at the two positions are main burrs on the front side of the wheel after machining, and must be removed. At present, the burrs at the rim and the cap section are mostly manually removed, the magnitude of force when the burrs are manually removed is unlikely to control, and the burrs exist in the form of a ring, so the roundness and the concentricity of the rim and the cap section are difficult to guarantee after the burrs are removed.

SUMMARY OF THE INVENTION

The present application provides a device for automatically removing burrs from the front rim and the cap section of a wheel, which may be applied to automatic continuous production and may reduce the labor intensity of workers, improve the production efficiency, improve the roundness of the rim and the cap section and improve the burr removing effect.

In order to fulfill the above purposes, the present application adopts the technical solution: An automatic wheel front burr removing device comprises a main frame, a secondary frame, a lifting cylinder, guide posts, a support plate, guide sleeves, guide rails, a left slide plate, positioning wheels, positioning posts, a gear rack structure, a lifting table, a right slide plate, a positioning cylinder, a support frame, a station rotating motor, a bearing seat, bearings, a shaft, a rotating platform, a station I manipulator, a station II manipulator, a station III manipulator, a station IV manipulator, clamping wheels, a rim burr cutter head, a feeding slide plate I, guide posts I, cylinders I, a servo motor I, a cap section burr cutter, a feeding slide plate II, guide posts II, cylinders II, a servo motor II and a vision sensor.

The automatic wheel front burr removing device comprises four stations, wherein station I is a wheel positioning and clamping station; station II is a wheel rim burr removing station; station III is a wheel cap section burr removing station; and station IV is a wheel loosening and transferring station.

The support plate is mounted on the secondary frame, the two guide rails are symmetrically mounted on the support plate, and the left slide plate and the right slide plate are respectively mounted on the guide rails and connected with each other via the gear rack structure. Two of the four positioning posts are fixedly mounted on the left slide plate, the other two of the four positioning posts are also symmetrically fixedly mounted on the right slide plate, and the four positioning wheels are respectively fixed onto the four positioning posts. The positioning cylinder is connected with the right slide plate and provides a positioning power source, and when the positioning cylinder drives the right slide plate to move, the left slide plate moves synchronously with the right slide plate under the engagement action of gears and racks, thus centering a wheel. The lifting cylinder is fixed on the main frame, an output end of the cylinder is connected with the lifting table, the guide sleeves are fixed on the support plate, the guide posts are fixed below the lifting table, and the guide sleeves are matched with the guide posts. After the wheel is centered, the positioning wheels are loosened and reset, the lifting cylinder is started to drive the lifting table to ascend, and the lifting table contacts a wheel flange to jack the wheel, so that the wheel leaves a roller bed. When the wheel ascends to a certain height, the station I manipulator clamps the inner rim of the wheel, so that the wheel is clamped. This is the wheel positioning and clamping station.

The support frame is fixed on the main frame, the station rotating motor is mounted on the support frame, and an output end of the station rotating motor is connected with the rotating platform via the shaft. Four same manipulators are respectively the station I manipulator, the station II manipulator, the station III manipulator and the station IV manipulator, and are fixedly mounted on the rotating platforms, and the spacing angles between the manipulators are 90 degrees. The clamping part of each manipulator has four fixed clamping wheels, the four fixed clamping wheels may effectively clamp the inner rim of the wheel. The station rotating motor drives the rotating platform to rotate 90 degrees every time, thus realizing cyclic switching of the four stations.

A rim burr removing device is mounted on the main frame just above the station II manipulator. The four cylinders I moving synchronously are fixed above the main frame, the output ends of the cylinders I are connected with the feeding slide plate I, the servo motor I is mounted on the feeding slide plate I, the rim burr cutter head is mounted at an output end of the servo motor I, and the rim burr cutter head is provided with an internal cutting edge according to the outside diameter of the wheel. Under the guiding effect of the guide posts I, the cylinders I drive the rim burr cutter head to be fed down, and when the rim burr cutter head rotates, the cutting edge can remove rim burrs. This is the wheel rim burr removing station.

A cap section burr removing device is mounted on the main frame just above the station III manipulator. The four cylinders II moving synchronously are fixed above the main frame, the output ends of the cylinders II are connected with the feeding slide plate II, the servo motor II is mounted on the feeding slide plate II, and the cap section burr cutter is mounted at an output end of the servo motor II. Under the guiding effect of the guide posts, the cylinders II drive the cap section burr cutter to be fed down, and when the cap section burr cutter rotates, the cutting edge may remove cap section burrs. This is the wheel cap section burr removing station.

A roller bed is located just below the station IV manipulator, and the vision sensor is mounted on the roller bed. After rim and cap section burrs are removed from the wheel, the wheel arrives at the station IV via rotating handover of the manipulators, at the moment, the station IV manipulator is loosened, the wheel falls onto the roller bed, the vision sensor feeds back a signal when detecting the wheel, and the roller bed rotates and transfers the wheel having burrs removed to next procedure. This is the wheel loosening and transferring station.

The working process of the device is as follows: firstly, a logistics roller bed conveys a wheel having burrs to be removed to the station I, the positioning cylinder drives the right slide plate to move, the left slide plate moves synchronously with the right slide plate under the engagement action of gears and racks so as to center the wheel, and after the wheel is centered, the positioning cylinder is reset and the positioning wheels loosen the wheel. Then, the lifting cylinder is started to drive the lifting table to ascend to jack the wheel, the wheel leaves the roller bed, and when the wheel ascends to a certain height, the station I manipulator clamps the inner rim of the wheel, so that the wheel is clamped. Secondly, the station rotating motor drives the rotating platform to rotate 90 degrees, the clamped wheel arrives at the station II, the station IV manipulator rotates to the station I, and at the moment, next wheel having burrs to be removed arrives at the station I, is positioned, ascends and then is clamped by the station IV manipulator. When the wheel having burrs to be removed is positioned and clamped, rim burrs are removed from the wheel at the station II via feeding of the rotating rim burr cutter head. Thirdly, the station rotating motor drives the rotating platform to rotate 90 degrees, the wheel having burrs removed arrives at the station III, cap section burrs are removed via feeding of the cap section burr cutter, meanwhile, the station III manipulator has rotated to the station I to clamp next wheel having burrs to be removed, and the station IV manipulator has arrived at the station II to remove burrs from the rim. Fourthly, the station rotating motor drives the rotating platform to rotate 90 degrees again, the wheel having front burrs removed arrives at the station IV, the manipulator loosens the wheel, a roller bed transfers the wheel down, meanwhile, the station II manipulator has rotated to the station I to clamp next wheel having burrs to be removed, the station III manipulator clamping the wheel arrives at the station II to remove burrs from the rim, and the station IV manipulator clamping the wheel arrives at the station III to remove burrs from the cap section. Finally, the station rotating motor drives the rotating platform to rotate 90 degrees again, the station I manipulator returns to the station I. So far, a cycle is completed. The device enters a continuous and stable running state, the four stations perform their duties and run synchronously, the cycle time is determined by the time of positioning, ascending and clamping of a wheel having burrs to be removed, and front burrs of a wheel may be removed within 10 seconds by optimization, so the device is very efficient and flexible.

The device may be applied to automatic continuous production, may reduce the labor intensity of workers, improve the production efficiency, improve the roundness of the rim and the cap section and improve the burr removing effect, and has the characteristics of short cycle time, high efficiency, advanced process, flexibility, practicability and the like.

Figure 1:
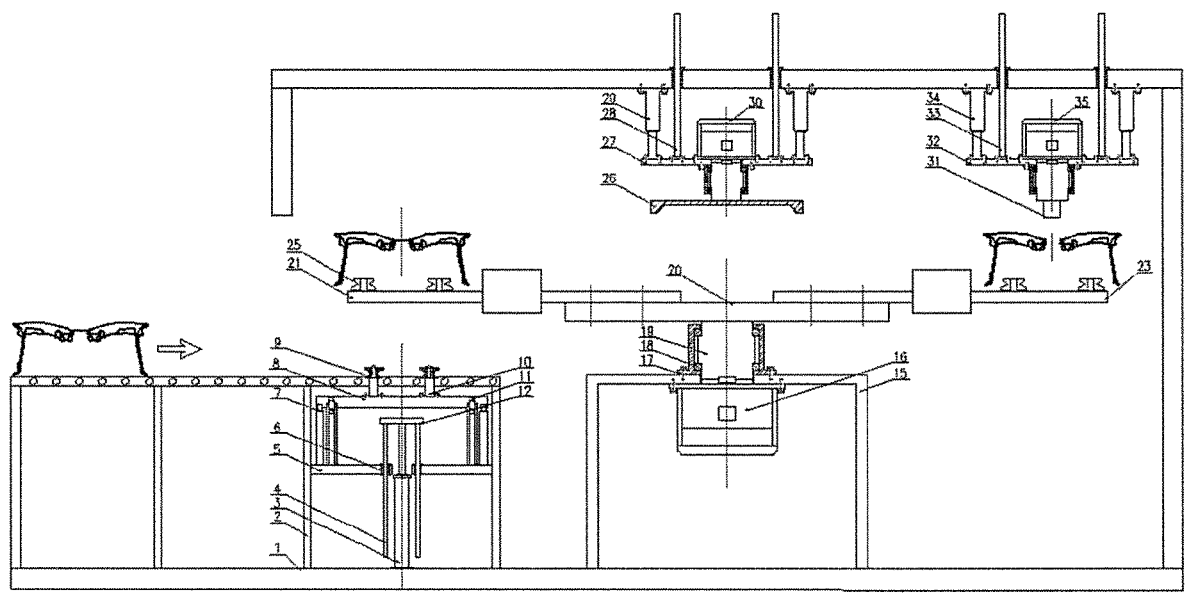
FIG. 1 is a front view of an automatic wheel front burr removing device of the present application.
Figure 2:
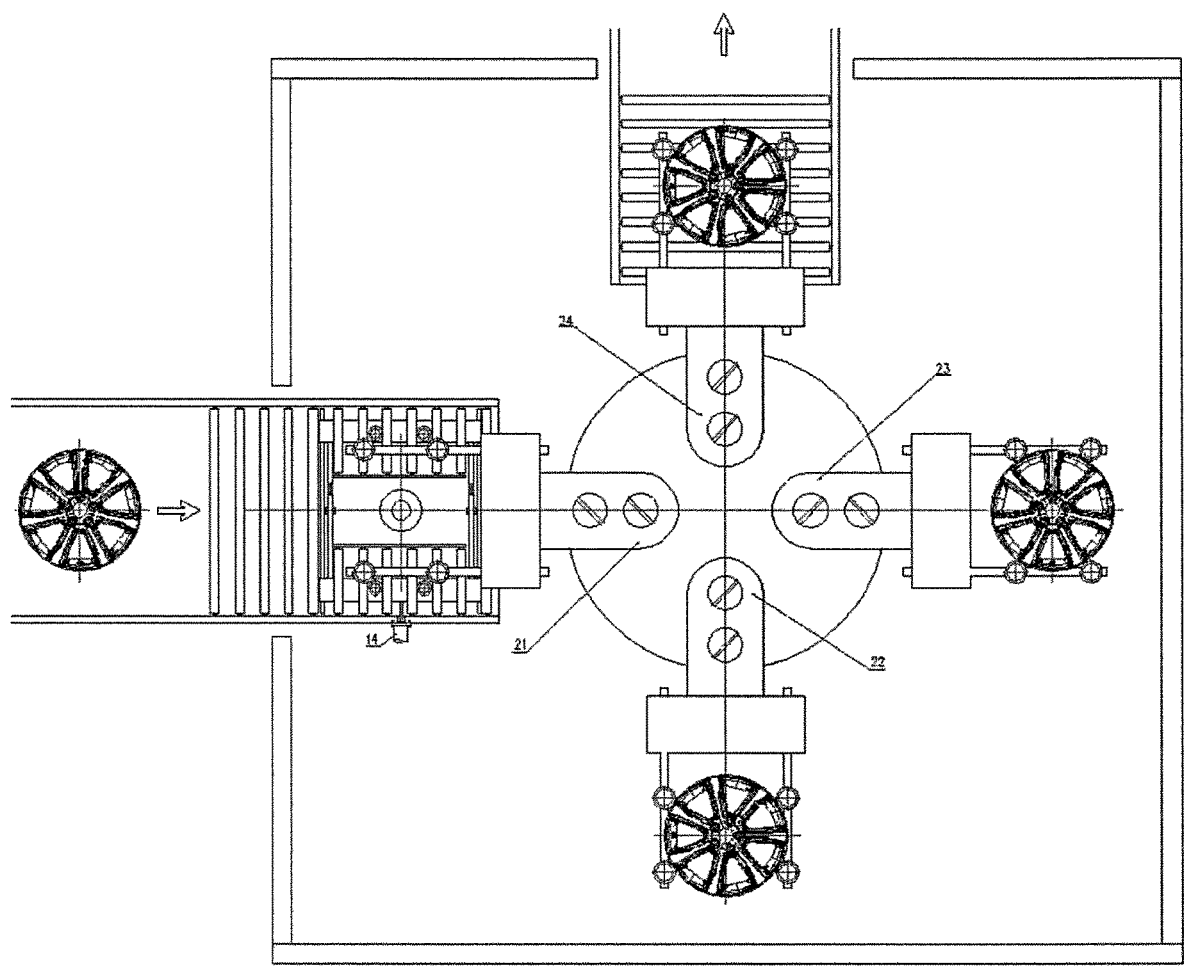
FIG. 2 is a top view of the automatic wheel front burr removing device of the present application.
Figure 3:
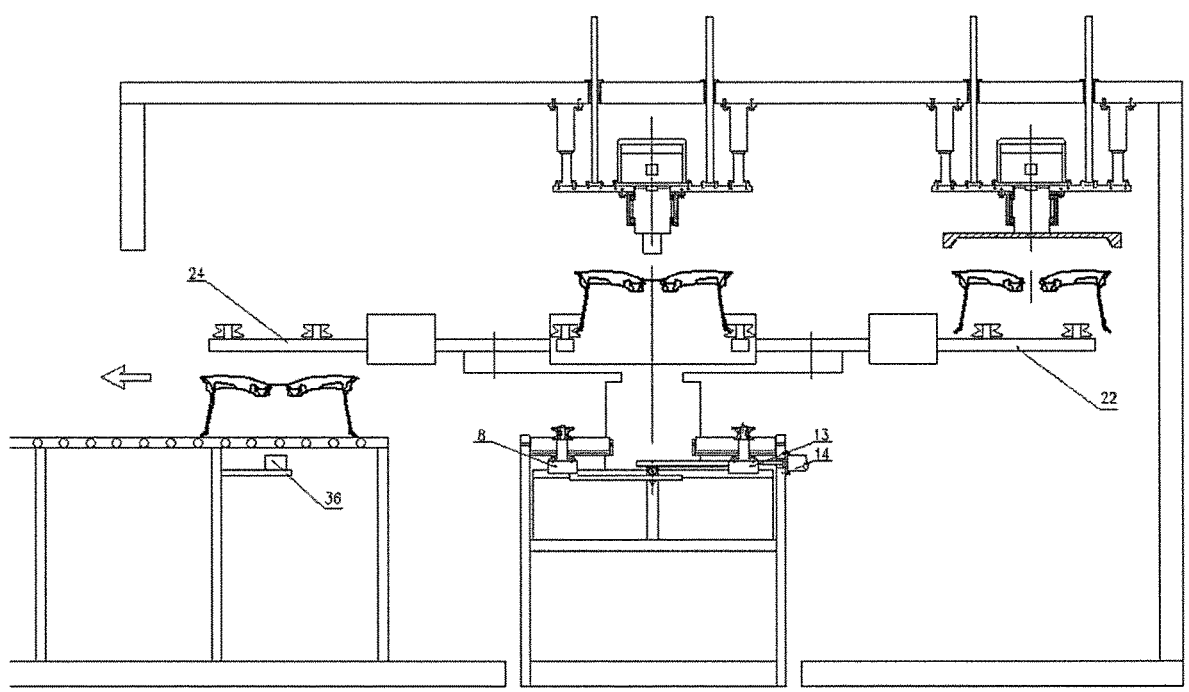
FIG. 3 is a left view of the automatic wheel front burr removing device of the present application.

In which: 1—main frame, 2—secondary frame, 3—lifting cylinder, 4—guide post, 5—support plate, 6—guide sleeve, 7—guide rail, 8—left slide plate, 9—positioning wheel, 10—positioning post, 11—gear rack structure, 12—lifting table, 13—right slide plate, 14—positioning cylinder, 15—support frame, 16—station rotating motor, 17—bearing seat, 18—bearing, 19—shaft, 20—rotating platform, 21—station I manipulator, 22—station II manipulator, 23—station III manipulator, 24—station IV manipulator, 25—clamping wheel, 26—rim burr cutter head, 27—feeding slide plate I, 28—guide post I, 29—cylinder I, 30—servo motor I, 31—cap section burr cutter, 32—feeding slide plate II, 33—guide post II, 34—cylinder II, 35—servo motor II, 36—vision sensor.

DETAILED DESCRIPTION OF THE EMBODIMENTS

Details and working conditions of a specific device provided by the utility model will be given below in combination with the accompanying drawings.

An automatic wheel front burr removing device comprises a main frame 1, a secondary frame 2, a lifting cylinder 3, guide posts 4, a support plate 5, guide sleeves 6, guide rails 7, a left slide plate 8, positioning wheels 9, positioning posts 10, a gear rack structure 11, a lifting table 12, a right slide plate 13, a positioning cylinder 14, a support frame 15, a station rotating motor 16, a bearing seat 17, bearings 18, a shaft 19, a rotating platform 20, a station I manipulator 21, a station II manipulator 22, a station III manipulator 23, a station IV manipulator 24, clamping wheels 25, a rim burr cutter head 26, a feeding slide plate I 27, guide posts I 28, cylinders I 29, a servo motor I 30, a cap section burr cutter 31, a feeding slide plate II 32, guide posts II 33, cylinders II 34, a servo motor II 35 and a vision sensor 36.

The automatic wheel front burr removing device comprises four stations, wherein station I is a wheel positioning and clamping station; station II is a wheel rim burr removing station; station III is a wheel cap section burr removing station; and station IV is a wheel loosening and transferring station.

The support plate 5 is mounted on the secondary frame 2, the two guide rails 7 are symmetrically mounted on the support plate 5, and the left slide plate 8 and the right slide plate 13 are respectively mounted on the guide rails 7 and connected with each other via the gear rack structure 11. Two of the four positioning posts 10 are fixedly mounted on the left slide plate 8, the other two of the four positioning posts 10 are also symmetrically fixedly mounted on the right slide plate 13, and the four positioning wheels 9 are respectively fixed onto the four positioning posts 10. The positioning cylinder 14 is connected with the right slide plate 13 and provides a positioning power source, and when the positioning cylinder 14 drives the right slide plate 13 to move, the left slide plate 8 moves synchronously with the right slide plate 13 under the engagement action of gears and racks, thus centering a wheel. The lifting cylinder 3 is fixed on the main frame 1, an output end of the cylinder 3 is connected with the lifting table 12, the guide sleeves 6 are fixed on the support plate 5, the guide posts 4 are fixed below the lifting table 12, and the guide sleeves 6 are matched with the guide posts 4. After the wheel is centered, the positioning wheels 9 are loosened and reset, the lifting cylinder 3 is started to drive the lifting table 12 to ascend, and the lifting table 12 contacts a wheel flange to jack the wheel, so that the wheel leaves a roller bed. When the wheel ascends to a certain height, the station I manipulator 21 clamps the inner rim of the wheel, so that the wheel is clamped. This is the wheel positioning and clamping station.

The support frame 15 is fixed on the main frame 1, the station rotating motor 16 is mounted on the support frame 15, and an output end of the station rotating motor 16 is connected with the rotating platform 20 via the shaft 19. Four same manipulators are respectively the station I manipulator 21, the station II manipulator 22, the station III manipulator 23 and the station IV manipulator 24, and are fixedly mounted on the rotating platform 20, and the spacing angles between the manipulators are 90 degrees. The clamping part of each manipulator has four fixed clamping wheels 25, the four fixed clamping wheels 25 can effectively clamp the inner rim of the wheel. The station rotating motor 16 drives the rotating platform 20 to rotate 90 degrees every time, thus realizing cyclic switching of the four stations.

A rim burr removing device is mounted on the main frame 1 just above the station II manipulator 22. The four cylinders I 29 moving synchronously are fixed above the main frame 1, the output ends of the cylinders I 29 are connected with the feeding slide plate I 27, the servo motor I 30 is mounted on the feeding slide plate I 27, the rim burr cutter head 26 is mounted at an output end of the servo motor I 30, and the rim burr cutter head 26 is provided with an internal cutting edge according to the outside diameter of the wheel. Under the guiding effect of the guide posts I 28, the cylinders I 29 drive the rim burr cutter head 26 to be fed down, and when the rim burr cutter head 26 rotates, the cutting edge can remove rim burrs. This is the wheel rim burr removing station.

A cap section burr removing device is mounted on the main frame 1 just above the station III manipulator 23. The four cylinders II 34 moving synchronously are fixed above the main frame 1, the output ends of the cylinders II 34 are connected with the feeding slide plate II 32, the servo motor II 35 is mounted on the feeding slide plate II 32, and the cap section burr cutter 31 is mounted at an output end of the servo motor II 35. Under the guiding effect of the guide posts 33, the cylinders II 34 drive the cap section burr cutter 31 to be fed down, and when the cap section burr cutter 31 rotates, the cutting edge can remove cap section burrs. This is the wheel cap section burr removing station.

A roller bed is located just below the station IV manipulator 24, and the vision sensor 36 is mounted on the roller bed. After rim and cap section burrs are removed from the wheel, the wheel arrives at the station IV via rotating handover of the manipulators, at the moment, the station IV manipulator 24 is loosened, the wheel falls onto the roller bed, the vision sensor 36 feeds back a signal when detecting the wheel, and the roller bed rotates and transfers the wheel having burrs removed to next procedure. This is the wheel loosening and transferring station.

The working process of the device is as follows: firstly, a logistics roller bed conveys a wheel having burrs to be removed to the station I, the positioning cylinder 14 drives the right slide plate 13 to move, the left slide plate 8 moves synchronously with the right slide plate 13 under the engagement action of gears and racks so as to center the wheel, and after the wheel is centered, the positioning cylinder 14 is reset and the positioning wheels 9 loosen the wheel. Then, the lifting cylinder 3 is started to drive the lifting table 12 to ascend to jack the wheel, the wheel leaves the roller bed, and when the wheel ascends to a certain height, the station I manipulator 21 clamps the inner rim of the wheel, so that the wheel is clamped. Secondly, the station rotating motor 16 drives the rotating platform 20 to rotate 90 degrees, the clamped wheel arrives at the station II, the station IV manipulator 24 rotates to the station I, and at the moment, next wheel having burrs to be removed arrives at the station I, is positioned, ascends and then is clamped by the station IV manipulator 24. When the wheel having burrs to be removed is positioned and clamped, rim burrs are removed from the wheel at the station II via feeding of the rotating rim burr cutter head 26. Thirdly, the station rotating motor 16 drives the rotating platform 20 to rotate 90 degrees, the wheel having burrs removed arrives at the station III, cap section burrs are removed via feeding of the cap section burr cutter 31, meanwhile, the station III manipulator 23 has rotated to the station I to clamp next wheel having burrs to be removed, and the station IV manipulator 24 has arrived at the station II to remove burrs from the rim. Fourthly, the station rotating motor 16 drives the rotating platform 20 to rotate 90 degrees again, the wheel having front burrs removed arrives at the station IV, the manipulator loosens the wheel, a roller bed transfers the wheel down, meanwhile, the station II manipulator 22 has rotated to the station I to clamp next wheel having burrs to be removed, the station III manipulator 23 clamping the wheel arrives at the station II to remove burrs from the rim, and the station IV manipulator 24 clamping the wheel arrives at the station III to remove burrs from the cap section. Finally, the station rotating motor 16 drives the rotating platform 20 to rotate 90 degrees again, the station I manipulator 21 returns to the station I. So far, a cycle is completed. The device enters a continuous and stable running state, the four stations perform their duties and run synchronously, the cycle time is determined by the time of positioning, ascending and clamping of a wheel having burrs to be removed, and front burrs of a wheel can be removed within 10 seconds by optimization, so the device is very efficient and flexible.

The device may be applied to automatic continuous production, may reduce the labor intensity of workers, improve the production efficiency, improve the roundness of the rim and the cap section and improve the burr removing effect, and has the characteristics of short cycle time, high efficiency, advanced process, flexibility, practicability and the like.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic wheel front burr removing device, comprising a main frame, a secondary frame, a lifting cylinder, guide posts, a support plate, guide sleeves, guide rails, a left slide plate, positioning wheels, positioning posts, a gear rack structure, a lifting table, a right slide plate, a positioning cylinder, a support frame, a station rotating motor, a bearing seat, bearings, a shaft, a rotating platform, a station I manipulator, a station II manipulator, a station III manipulator, a station IV manipulator, clamping wheels, a rim burr cutter head, a feeding slide plate I, guide posts I, cylinders I, a servo motor I, a cap section burr cutter, a feeding slide plate II, guide posts II, cylinders II, a servo motor II and a vision sensor, wherein the device comprises four stations; station I is a wheel positioning and clamping station; station II is a wheel rim burr removing station; station III is a wheel cap section burr removing station; and station IV is a wheel loosening and transferring station, the wheel positioning and clamping station is as follows: the support plate is mounted on the secondary frame, the two guide rails are symmetrically mounted on the support plate, and the left slide plate and the right slide plate are respectively mounted on the guide rails and connected with each other via the gear rack structure; two of the four positioning posts are fixedly mounted on the left slide plate, the other two of the four positioning posts are also symmetrically fixedly mounted on the right slide plate, and the four positioning wheels are respectively fixed onto the four positioning posts; the positioning cylinder is connected with the right slide plate and provides a positioning power source, and when the positioning cylinder drives the right slide plate to move, the left slide plate moves synchronously with the right slide plate under the engagement action of gears and racks, thus centering a wheel; the lifting cylinder is fixed on the main frame, an output end of the cylinder is connected with the lifting table, the guide sleeves are fixed on the support plate, the guide posts are fixed below the lifting table, and the guide sleeves are matched with the guide posts; after the wheel is centered, the positioning wheels are loosened and reset, the lifting cylinder is started to drive the lifting table to ascend, and the lifting table contacts a wheel flange to jack the wheel, so that the wheel leaves a roller bed; when the wheel ascends to a certain height, the station I manipulator clamps the inner rim of the wheel, so that the wheel is clamped;

the wheel rim burr removing station is as follows: a rim burr removing device is mounted on the main frame just above the station II manipulator; the four cylinders I moving synchronously are fixed above the main frame, the output ends of the cylinders I are connected with the feeding slide plate I, the servo motor I is mounted on the feeding slide plate I, the rim burr cutter head is mounted at an output end of the servo motor I, and the rim burr cutter head is provided with an internal cutting edge according to the outside diameter of the wheel; under the guiding effect of the guide posts I, the cylinders I drive the rim burr cutter head to be fed down, and when the rim burr cutter head rotates, the cutting edge can remove rim burrs;

the wheel cap section burr removing station is as follows: a cap section burr removing device is mounted on the main frame just above the station III manipulator, the four cylinders II moving synchronously are fixed above the main frame, the output ends of the cylinders II are connected with the feeding slide plate II, the servo motor II is mounted on the feeding slide plate II, and the cap section burr cutter is mounted at an output end of the servo motor II; under the guiding effect of the guide posts, the cylinders II drive the cap section burr cutter to be fed down, and when the cap section burr cutter rotates, the cutting edge may remove cap section burrs; and the wheel loosening and transferring station is as follows: a roller bed is located just below the station IV manipulator, and the vision sensor is mounted on the roller bed; after rim and cap section burrs are removed from the wheel, the wheel arrives at the station IV via rotating handover of the manipulators, at the moment, the station IV manipulator is loosened, the wheel falls onto the roller bed, the vision sensor feeds back a signal when detecting the wheel, and the roller bed rotates and transfers the wheel having burrs removed to next procedure.

2. The automatic wheel front burr removing device of claim 1, wherein four same manipulators are respectively the station I manipulator, the station II manipulator, the station III manipulator and the station IV manipulator, and are fixedly mounted on the rotating platform, and the spacing angles between the manipulators are 90 degrees; the station rotating motor drives the rotating platform to rotate 90 degrees every time, thus realizing cyclic switching of the four stations.

3. The automatic wheel front burr removing device of claim 1, wherein a rim burr removing device is mounted on the main frame just above the station II manipulator; when the rim burr cutter head rotates, the cutting edge is configured to remove rim burrs; a cap section burr removing device is mounted on the main frame just above the station III manipulator; when the cap section burr cutter rotates, the cutting edge is configured to remove cap section burrs; a roller bed is located just below the station IV manipulator, and the vision sensor is mounted on the roller bed.

\* \* \* \* \*